Patented Feb. 2, 1937

2,069,314

UNITED STATES PATENT OFFICE 2,069,314

PROCESS FOR MAKING BITUMINOUS COMPOSITIONS

James K. Hunt and Joseph Harrel Shipp, Wilmington, Del., assignors to E. I. du Pont de Nemours & Company, Wilmington, Del., a corporation of Delaware No Drawing. Application September 19, 1933, Serial No. 690,170

8 Claims. (Cl. 196—22)

This invention relates to the production of improved asphaltic materials from certain bitumens and more particularly to the utilization of the improved asphalts derived from asphaltites in the manufacture of coating compositions.

It is common practice in the petroleum industry to distill crude oil, leaving a residue of asphaltic material behind. The properties of this residue will depend somewhat upon the point to which the distillation is carried. In this sense the properties of the petroleum bitumen may be said to be modified by distillation. Such distillations of bituminous materials derived from petroleum are not, however, useful for the purposes of the present invention which is concerned only with the heating or partial distillation of certain naturally occurring bitumens. We have found that coating compositions containing bituminous materials derived from petroleum are, with respect to both gloss and durability, far inferior to our improved compositions containing the processed asphaltites described herein.

Bituminous materials of all kinds, including oils, asphalts, and coal, have also been destructively distilled for the production of liquid and gaseous hydrocarbons and coke. In these processes the distillation is carried to coke formation and a liquid hydrocarbon such as gasoline or oil is obtained as a distillate.

Volatile hydrocarbons have been produced by the partial distillation at temperatures of 680–860° F. of paraffinic, and "bituminous" substances such as resinous extracts from petroleum and low temperature tars, vitriolic mud, and natural asphalt waxes, and by the purification of bituminous compounds by distilling with an alkaline earth at 572° F. These processes are not concerned with the asphaltites of the present invention, nor are they concerned with the properties and utility of the residues. These processes are concerned only with the production of liquid hydrocarbons such as gasoline and oils. The residues, where mentioned at all, are coke. The materials treated are referred to as natural waxes, resinous extracts from petroleum and low temperature tars, bituminous, asphaltic, and paraffinic substances.

Processes for increasing the solubility of gilsonite and for increasing the fixed carbon and iodine numbers of various asphalts by heating the asphalt at low temperatures and for short periods of time are also known. The mild treatments as given in these processes do not, however, produce the results obtained by processing under the conditions of the present invention, where the temperatures and time of treatment are such that gloss and durability are greatly enhanced.

Wurtzilite and elaterite have also been heat treated to render them fusible and soluble. These bitumens are, however, pyrobitumens and not asphaltites. Furthermore, the products obtained are inferior in coating compositions to even untreated asphaltites, with which the present invention is concerned.

Other methods recorded for treating bitumens include the preparation of difficultly fusible masses from Trinidad asphalt by distillation of 10% volatile matter. It is to be observed that the same treatment of an asphaltite such as gilsonite lowers rather than raises the melting point (see Example 1).

Summing up, the prior art includes various methods for processing bitumens, but the treatment of asphaltites as disclosed herein, and the discovery that markedly improved enamels may be made from the products of this treatment, has not been known hitherto.

This invention has as an object the production of improved bituminous material particularly suitable for the manufacture of coating compositions. A further object is a process for treating bitumens of the type known as asphaltites. Another object is the preparation of improved coating compositions. A still further object is the manufacture of articles coated with a film of asphaltic nature which possess to a high degree the properties most desired in these articles such as high gloss retention and enhanced durability. Other objects will appear hereinafter.

These objects are accomplished by a special processing of a bitumen of the asphaltite type and formulating the processed asphaltite into coating compositions.

We have discovered that the naturally occurring bitumens defined by Abraham ("Asphalts and Allied Substances", D. Van Nostrand Co., 3rd Edition, 1929, pages 36, 37, 164, 644, and 645) as "asphaltites" are remarkably improved by partially distilling at a temperature not under 680° F., and preferably between 698° and 752° F. The extreme upper limit is probably very close to 752° F. and should in no case be so high that a product incompatible with oils and/or thinners is produced. Temperatures as low as 680° F. sometimes produce the desired properties in the asphaltite. However, temperatures under 698° F. require a period of time so long that it is not practical. From 5 to 30% of distillate is removed in the course of three to ten hours and the residual bitumen has very different properties than the starting materials.

We wish to make it clear that the distillation referred to herein is not merely a volatilization of material as it exists in the raw asphaltite. In fact, asphaltites contain very little volatile material as such, as evidenced by the fact that gilsonite, glance pitch, and grahamite lose less than 2% volatile on heating to 325° F. The present process involves an actual cracking of the bitumen, and removal of the volatile matter formed as a result of the cracking.

Asphaltites include gilsonite, glance pitch, and grahamite and, as defined in the reference just mentioned, are a species of bitumen; they are dark-colored, comparatively hard and non-volatile solids composed principally of saturated hydrocarbons substantially free from oxygenated bodies and crystallizable paraffines; sometimes associated with mineral matter, the non-mineral constituents being fusible and largely soluble in carbon disulfide.

The raw materials used in the preparation of my improved enamels are asphaltites as exemplified by gilsonite, glance pitch (of which Barbados manjak is an example), and grahamite. "Asphaltites" are differentiated from "native" or "natural asphalts" on the one hand, and from "asphaltic pyrobitumens" on the other hand, on the basis of certain physical and chemical characteristics, e. g., fusing point and fixed carbon content. The asphaltites have a softening or fusing point of from 230° F. to 600° F. (Kramer-Sarnow fusing point method, details of which are given on page 682 of Abraham) or from 270° F. to 625° F. by the Ring and Ball method (details of which are given on page 687 of Abraham). According to page 165 of Abraham, gilsonite runs fairly uniform in composition and has a fusing point of 230° F. to 350° F. (K. & S. method) or 270° F. to 400° F. (Ball and Ring method).

Asphaltites (gilsonite, glance pitch, and grahamite) as a class differ from "native asphalts" in that the latter have softening or fusing points definitely under those of the asphaltites. Thus, Trinidad asphalt, a typical "native asphalt", has a softening point around 188° F. by the K. & S. method or 206° F. by the Ring and Ball method. (See Abraham, page 135.) As indicated above, however, there is not always a sharp break in the softening point values as one proceeds from the "native asphalts" to the "asphaltites".

The asphaltites are distinguished from "asphaltic pyrobitumens" (elaterite, wurtzilite, albertite, and impsonite) by the fact that the latter are infusible, i. e., cannot be fused without decomposition.

My method of improving gilsonite, or other asphaltite, consists in heating the bituminous material to a temperature of 698–752° F. (370–400° C.) for 3–10 hours in a suitable vessel. Obviously higher temperatures in the range 698–752° F. require a shorter time of heating, and lower temperatures in this range a longer time. The exact optimum conditions are best determined for each asphaltite by simple experiment. In no case should the treatment be so drastic that incompatible products are obtained. It is obvious that different sized batches will require different periods of time for bringing to the critical temperature range. Either an open kettle, or a covered vessel fitted with an external receiver condenser may be used. Completely closed vessels (autoclaves) can also be used, but less satisfactory results are obtained because of operating difficulties. At a temperature of approximately 698° F. (370° C.), volatile matter is formed by the cracking of the bitumen. If the equipment includes a condenser, this volatile material may be collected as a light water-white or yellow liquid consisting of a mixture of various hydrocarbons with considerable unsaturated material. The actual removal of volatile products formed is not necessary, but the amount removed affords a convenient method of following the course of the reaction. If the process is carried out at atmospheric pressure, there may be some variation in the amount of distillate recovered (when the kettle is equipped with a condenser), or in the loss in weight (with or without a condenser). If the loss of volatile matter formed is used as the criterion for following the reaction, it is necessary that a volatile loss of at least 5% and not more than 30% be obtained in order to secure definite improvements in the resulting products. If more than 25–30% volatile is removed, the resulting enamel is likely to be "grainy", and may become unduly thick on aging. The optimum appears to be about 20% distillate when the kettle is equipped with condenser, or 25% volatile loss when kettle is not equipped with a condenser. The apparent discrepancy may be explained by the fact that non-condensable volatile matter, such as permanent gases, is also formed during the treatment. When the operation is carried out in an open kettle and loss of volatile matter determined by difference in weight before and after processing, these non-condensable gases show up as a weight loss, but when a kettle equipped with a condenser is used, these permanent gases are not condensed and therefore are lost. In other words, 20 lbs. of collected distillate might correspond to 25 lbs. weight loss from the asphaltite, assuming the formation of 5 lbs. of non-condensable volatile.

In general, processing under the critical conditions just given causes an increase in fixed carbon content of the asphaltite. This increase is most pronounced with gilsonite (see Example 1) and less so with glance pitch (see Example 2). It is believed that a change in chemical constitution (as reflected by increase in amount of fixed carbon) is responsible for the greatly increased utility of the processed asphaltites. These chemical changes are also reflected by lowering of fusing point and increase of iodine number.

"Fixed carbon" content as used herein, has the conventional meaning, and is determined by the method given by Abraham "Asphalts and Allied Substances", page 711. The fixed carbon content of gilsonite, as treated in Example 1, changes from 18% to 24% and this represents a percentage increase of 33%. Thus by the expression "percentage increase in fixed carbon" is meant $$\frac{\text{final amount} - \text{original amount}}{\text{original amount}}$$

In other words, the above-quoted expression does not represent an absolute figure, but a relative one, which is based on the original amount of fixed carbon.

The percentage increase in fixed carbon of the asphaltite is, we believe, the real criterion for obtaining products which form highly improved films with resins, oils, etc. This increase in the per cent of fixed carbon by treating according to the present process, is critical in the following sense. The fixed carbon cannot be increased beyond certain limits, depending upon the particular asphaltite used, without obtaining incompatible products. Thus, untreated gilsonite, with a fixed carbon content of 18%, can be processed to a maximum fixed carbon content of about 30% (a percentage increase of 67%). Efforts to increase the fixed carbon of this material much above 30% results in a product which is not compatible with resins, oils and thinners. Untreated glance pitch, with an original fixed carbon content of 25%, can be processed to a maximum of about 35% of fixed carbon (a percentage increase of 40%). Further processing results in an incompatible product. Grahamite with an original fixed carbon of around 44% can be processed only to about 50% (an increase of 14%).

The lower limit in the increase in percentage of fixed carbon is determined only by the degree of change required to give practical improvement. Any increase in fixed carbon gives an improved product and the greater the increase in fixed carbon up to the point of incompatibility the greater the improvement. The lower limit for definite and practical improvement varies somewhat with the different asphaltites, as is shown from the following table.

Table I

| Asphaltite | Original fixed carbon | Final fixed carbon | Percent increase in fixed carbon | Life of film** |
|---|---|---|---|---|
| *Gilsonite | 18 | 18 | 0 | 8 weeks |
| Gilsonite | 18 | 22 | .22 | 20 weeks |
| *Glance pitch | 25 | 25 | 0 | 12 weeks |
| Glance pitch | 25 | 27 | 8 | 18 weeks |
| *Grahamite | 44 | 44 | 0 | 28 weeks |
| Grahamite | 44 | 50 | 14 | Definite improvement |

*Unprocessed.
**"Life of film" refers to the properties of the enamels prepared according to Example 1 and represents the period of time for the gloss and durability to be reduced to the "fair" rating.

Thus it is seen that gilsonite should be processed to a percentage increase in fixed carbon of at least 20%, making the range for improvement about 20–65%. Likewise glance pitch should be processed to a percentage increase in fixed carbon of at least 8%, and the range for definite improvement is about 8–40%. Grahamite has not been studied extensively, but we have found that a percentage increase in fixed carbon of 10–15% produces a definitely better product for preparing enamels.

The following examples are illustrative of methods for carrying out the invention. The starting material in Example 1 is the naturally occurring bitumen gilsonite coming from the inner part of the vein and classed as "selects". Gilsonite is widely used in paints and enamels, but it is recognized that compositions based upon this bitumen lose their gloss in a short time.

EXAMPLE 1

Gilsonite was heated at around 700–725° F. in a vessel fitted with an external receiver condenser to collect the distillate. During eight hours, 10% of distillate was collected calculated on the weight of bitumen taken. The properties of the resulting product were quite different from the properties of the original material as is shown in the following table:

Table II

|  | Original gilsonite | Treated gilsonite |
|---|---|---|
| Fixed carbon | 18% | 24% |
| Fusing point | 305° F. | 201° F. |
| Iodine number | 58.8 | 70 |

The fusing point was determined by the Ball and Ring method; see Abraham's "Asphalts and Allied Substances", 3rd Edition (1929), p. 687. The treatment of Example 1 causes a percentage increase in fixed carbon of 33%.

The bituminous residue obtained by the treatment outlined above was made into a baking enamel by the formula given below:

| | Parts by weight |
|---|---|
| Treated gilsonite | 200 |
| Resin | 240 |
| Kerosene | 270 |
| Hi-flash naphtha | 90 |
| Drier | 12 |

To make this enamel the treated gilsonite is heated to around 600° F., cooled to 575° F. and the resin, previously heated to 250° F., added. The kerosene and Hi-flash naphtha are mixed and added to the asphalt-resin mixture. The drier is added after the enamel has cooled.

The resin was made from:

| | Parts |
|---|---|
| Glycerin | 58 |
| Sodium hydroxide | 12 |
| Linseed oil | 560 |
| Rosin | 78 |
| Phthalic anhydride | 124 |

To make this resin the sodium hydroxide is dissolved in a small amount of water and stirred into the glycerin. The linseed oil is then added and the mass heated to 480° F. and held at that temperature for 1–2 hours, or until alcoholysis has taken place. The rosin and phthalic anhydride are then added in the order named and the preparation completed by heating at 460° F. for three hours.

Instead of the above resin, others of a similar or different nature can be used. The rosin-drying oil modified polyhydric alcohol-polybasic acid resins seem to be most satisfactory. The amounts of rosin and oil (or oil acids) can be varied, with compensating changes in proportions of other ingredients. The polyhydric alcohol-polybasic acid resins are generally preferred to other types and may be modified by one or more of the common ingredients used in their manufacture. These are of three types: esters, such as fatty oils (linseed oil, China-wood oil, cottonseed oil, castor oil, coconut oil), dibutyl phthalate, triacetin, etc.; monobasic acids, such as rosin and other natural acidic resins, fatty oil acids, stearic acid, oleic acid, butyric acid, benzoic acid; and monohydric alcohols, such as butyl, benzyl, oleyl, ethoxy ethyl, cyclohexyl, etc. The polyhydric alcohols used may be glycerol, glycols, sorbitol, pentaerythritol, etc.; the polybasic acids may be phthalic, succinic, adipic, maleic, citric, diphenic, quinolinic, etc.

The composition of the drier is as follows:

| | Parts |
|---|---|
| Linseed oil fatty acids | 2 |
| Rosin | 8 |
| Basic ferric acetate | 1 |
| Hi-flash naphtha | 10 |

To make this drier the rosin and linseed oil fatty acids are melted together at 350° F. and the basic ferric acetate stirred in slowly. The temperature is raised to 420° F. and held at that point until solution is complete. The Hi-flash naphtha is then added. Other driers, such as cobalt, manganese, and lead, while satisfactory, are less suitable.

It is of interest, and significant, that in enamels of the type described above, and also those which follow, the distillate from processed asphaltite may be used as thinner, replacing all or a portion of the kerosene and naphtha. Enamels based on distilled gilsonite and thus thinned with the gilsonite distillate show the same superior durability as when kerosene and naphtha are used as thinner. This demonstrates that the process is not one of simple distillation resulting in only a concentrated bitumen, since if this were the case the durability (as reflected by gloss retention) of the enamels thinned with gilsonite distillate, and based on processed gilsonite, would not be superior to that of enamels based on the unprocessed gilsonite. The figures in Table III show that enamels from processed gilsonite, thinned with its volatile decomposition products or with other thinners, is superior to unprocessed gilsonite.

EXAMPLE 2

A sample of glance pitch having a fusing point of 343° F. (R. & B. method) was distilled at around 700° F. by the same method as that described above for gilsonite until 10% of distillate had been removed. This treatment causes an increase in fixed carbon content of from 25 to 30%, or a percentage increase of 20%. The processed glance pitch was made into an enamel by the same formula as given above for gilsonite under Example 1, and panels were made and exposed to the weather along with controls similarly prepared from untreated glance pitch (see Table IV. The enamel from the treated bitumen was greatly superior in gloss retention to the enamel prepared from untreated bitumen, as shown by the figures in Table IV.

EXAMPLE 3

Varnish for rubbercoated fabrics

| | Parts by weight |
|---|---|
| Processed gilsonite | 100.00 |
| Solvent naphtha | 132.79 |
| Turpentine | 120.00 |
| Raw linseed oil | 120.00 |
| Iron resinate | 16.41 |

The gilsonite was processed by heating it in a kettle equipped with an external receiver condenser at about 700° F. for 5-8 hours to a volatile loss of about 25%.

In order to make the varnish from these ingredients the processed gilsonite is heated to 500° F., allowed to cool to 425° F., an equal weight of solvent naphtha added and the mixture stirred until the gilsonite is dissolved. To this solution is added 240 parts by weight of a 50% solution of linseed oil in turpentine and 16.41 parts by weight of iron resinate dissolved in 32.79 parts of solvent naphtha, the latter solution containing 2.44% iron. If additional thinner is required, solvent naptha, turpentine, or the distillate from processed gilsonite may be used.

This varnish is designed for use on coated fabrics, more particularly rubber-coated fabrics of the kind used as material for automobile tops. In making this type of article, the varnish is applied directly over the uncured rubber-coated fabric, and the system then baked at a temperature suitable for vulcanizing the rubber, e. g., 240-270° F. for 2-4 hours, depending upon the composition of the rubber compound with which the fabric is coated. My preferred process for coating rubber-coated fabrics with the above varnish involves the application of an intermediate coat of oil varnish to the fabric, allowing this oil varnish to dry at ordinary temperatures (or force-dry at 240-270° F. for 15 min. to one hour), after which the final coat consisting of the above bituminous varnish is applied and the system baked at 240-270° F. for 2-4 hours, depending upon the composition of the underlying rubber compound.

EXAMPLE 4

High heat fender enamel

| | Parts by weight |
|---|---|
| Processed gilsonite | 450 |
| F wood rosin | 50 |
| Lump burnt umber | 18 |
| Manganese resinate | 6 |
| Alkali refined linseed oil | 213 |
| Refined menhaden oil | 213 |
| Kerosene | 605 |
| V. M. & P. naphtha | 167 |
| Mineral spirits | 118 |

The gilsonite was processed by heating it at about 700° F. to a loss of about 20-25% volatile matter in a closed kettle equipped with an external receiver condenser.

The enamel is made from these ingredients as follows: The mixed oils are treated with the lump burnt umber (suspended in a wire basket) for 2 to 2½ hours at 600° F. After standing about one day, the processed gilsonite, wood rosin, and manganese resinate are added and the mixture heated to 600° F., then cooled and reduced with thinner. If a lower viscosity is required, additional kerosene may be used.

This enamel, over a suitable undercoat, e. g., a "rubber first coat", is baked ½ hour at 420° F.

EXAMPLE 5

High heat fender enamel

An enamel having excellent gloss retention characteristics may be prepared by substituting processed glance pitch, preferably a South American glance pitch or Barbados manjak (heated at around 700° F. in a closed kettle with condenser to a loss of 20-25% volatile) for the processed gilsonite for Example 4 above. No substantial change in cooking schedule for the oil-rosin-processed glance pitch mixture is necessary, although it should be borne in mind that the glance pitches in general (including processed material as well as the raw) body relatively quickly at high temperatures, thus necessitating in some cases a reduction in temperature and/or time of heating over that when gilsonite is used.

EXAMPLE 6

Oil type black baking japan

| | Parts by weight |
|---|---|
| Processed glance pitch | 150 |
| Alkali refined linseed oil | 320 |
| Lump burnt umber | 20 |
| Lump Prussian blue | 5 |
| Manganese resinate | 4 |
| Kerosene | 257 |
| Mineral spirits | 246 |

The pitch, preferably Barbados manjak or a South American glance pitch having a fusing point around 350° F. (R. & B. method), is heated at about 700 F. to a loss of about 20% volatile. Gilsonite processed by heating at around 700° F. to a 20-26% volatile loss may also be used.

To make this baking japan, the oil is heated with the umber (suspended in basket) for 3 to 4 hours at 600° F., allowed to cool to 300° F. and the processed glance pitch, Prussian blue, and manganese resinate added. The mixture is then heated at around 350° F. until the processed glance pitch is melted, the temperature finally being carried to 550° F. The product is cooled and reduced with kerosene and mineral spirits. If necessary, it may be thinned with additional kerosene to proper consistency for dipping. A suitable baking schedule is 2 hours at 450° F.

EXAMPLE 7

*Bituminous varnish (without oil or resin)*

|  | Parts by weight |
|---|---|
| Processed gilsonite | 350 |
| Manganese dioxide | 14 |
| Turpentine (or substitute) | 105 |

The gilsonite was processed by heating at approximately 700° F. for 6–8 hours to a loss of about 25% volatile.

In making the varnish the processed gilsonite is melted by heating to approximately 450° F. The manganese dioxide is added gradually with constant stirring. The temperature is then carried slowly to 575° F. and held at this point for 10 or 15 minutes, after which the mixture is cooled and thinned with turpentine, mineral spirits, or the distillate from processed gilsonite.

EXAMPLE 8

*Kauri black baking japan*

|  | Parts by weight |
|---|---|
| Processed gilsonite | 200 |
| Kauri resin | 300 |
| Alkali refined linseed oil | 190 |
| Lump burnt umber | 5 |
| Turpentine | 600 |
| Mineral spirits | 150 |

The gilsonite was processed by heating at 700° F. for 5–8 hours to a 20–25% loss of volatile.

These ingredients are combined as follows. The processed gilsonite is melted by heating to approximately 450° F., the kauri (which may be used in the form of "dust") then added and the mixture carried to about 500° F. where it is held until the resin is in solution (usually 30 to 35 minutes). The oil, with which umber has previously been incorporated, is preheated to around 450° F., added to the resin-gilsonite mixture, and the whole heated to around 500° F. for 1 to 1½ hours. The product is cooled and reduced with thinner. The distillate from the processed gilsonite may also be used as thinner, replacing all, or a portion, of the turpentine and mineral spirits.

If lower viscosity is desired, additional thinner can be used, preferably turpentine (either gum spirits or wood turpentine), or distillate from processed gilsonite. Enamels should be baked for 2 to 3 hours at 350° F.

EXAMPLE 9

*Manjak baking japan*

|  | Parts by weight |
|---|---|
| Processed glance pitch | 450 |
| F wood rosin | 50 |
| Lump burnt umber | 18 |
| Manganese resinate | 6 |
| Alkali refined linseed oil | 426 |
| Kerosene | 605 |
| V. M. & P. naphtha | 167 |
| Mineral spirits | 118 |

The pitch, preferably Barbados manjak or a South American glance pitch, having a fusing point of around 350° F. (R. & B. method), is processed by heating in a closed kettle with an external receiver condenser at about 750° F. for 6–8 hours to a loss of about 20% volatile.

To make this baking japan, the linseed oil is heated with the umber (suspended in basket) for 3 hours at 600° F. In the meantime, the processed glance pitch is melted in another kettle, and heated at 400–450° F. for 4 to 5 hours. The oil (which has been permitted to cool to 400–450° F.) is then run into the processed glance pitch, the rosin and manganese resinate added, the temperature raised to 500° F. and the whole cooled and reduced with thinner. If lower viscosity is desired, additional kerosene, or distillate from processed asphaltite, may be used.

This enamel, over a suitable undercoat (e. g., so-called "rubber first coat"), is baked for ½ hour at 420° F.

EXAMPLE 10

*Grahamite baking enamel*

Using the formula shown under Example 9, an enamel having good gloss retention may be made by substituting processed grahamite for the processed glance pitch of Example 9. (The grahamite is processed preferably in a closed kettle with an external receiver condenser at about 700° F. for 6–8 hours, or to a volatile loss of about 20%.) A relatively low-fusing grahamite (370–460° F., R. & B. method) is preferable, such as the grahamite from the Vistabella mine in Trinidad, but grahamite having a higher fusing point may be used by resorting to a somewhat higher temperature for melting out the processed grahamite, and fluxing the grahamite with the rosin content of the enamel. The processing produces an appreciable increase in percentage of fixed carbon. Care should be exercised that the enamel does not become too thick during cooking, which, as those skilled in the art fully appreciate, is likely to happen with either glance pitch or grahamite.

EXAMPLE 11

*Pigmented baking enamel*

BASE

|  | Parts by weight |
|---|---|
| Carbon black | 24 |
| Enamel shown under Example 4 | 55 |
| Raw linseed oil | 21 |

FINISHED PRIMER

|  |  |
|---|---|
| Base shown above | 21 |
| Enamel of Example 4 | 67 |
| Mineral spirits | 12 |

To make this enamel the base is ground in a ball mill until the proper dispersion of pigment is obtained. The base is then mixed with additional enamel of Example 4 and reduced with mineral spirits. If lower viscosity is required, additional mineral spirits, kerosene, or distillate from processed asphaltite may be used.

A single coat of this enamel may be baked in ½ hour at 450° F. An enamel pigmented in accordance with the above formula is particularly suitable as a primer ("rubber first coat") for use under non-pigmented baking enamels of the types shown in the previous examples because of its good adhesion to steel and its good durability.

Example 12

*Varnish for coated fabrics*

| | Parts by weight |
|---|---|
| Processed gilsonite | 100 |
| Solvent naphtha | 100 |
| Spirits of turpentine | 80 |
| Bodied China-wood oil | 78.13 |
| Lead resinate | 1.17 |
| Manganese resinate | 0.70 |

The gilsonite was processed by heating it at approximately 700° F. for 5–8 hours to a volatile loss of 20–25%.

To make the varnish the processed gilsonite is heated to 500° F., allowed to cool to 425 F., the solvent naphtha added, and stirred until the processed gilsonite is dissolved. The bodied China-wood oil—turpentine—drier solution (see below) is then added. If additional thinner is needed solvent naphtha, turpentine, or distillate from processed gilsonite may be used.

The China-wood oil—turpentine—drier solution is made as follows: The raw wood oil is heated to 385° F. and the lead and manganese resinates added slowly with constant stirring. The oil is heated to 425° F. in the course of about one hour and held for about 45 minutes. It is then cooled and reduced with turpentine.

The varnish is applied to the fabric in the manner indicated in Example 3.

I have found also that simple heat treatment of glance pitch in an autoclave at around 700° F. for a period of about 6 hours gives rise to an improvement in the bituminous material, as evidenced by superior gloss retention of fender enamels based on such treated glance pitch. In the autoclave treatment there is generally no distillation of volatile matter. However, it is feasible for the autoclave to carry a condensing system maintained at the same pressure as the autoclave; such an arangement permits a closer check on the progress of the reaction through the observation of the amount of distillate produced. The asphaltite may be heated in the autoclave either alone or with small amounts of liquid hydrocarbons, e. g., kerosene or crude oil.

While I do not wish to be limited to any theory for explaining the improvement in my processed asphaltites, I believe that the bitumen is first cracked by the heating process. This cracking results in the formation of highly unsaturated molecules which combine with each other, or undergo internal rearrangement, which results in a more highly polymerized and stable product. This recombination or repolymerization is apparently not complete, since the final product is still more unsaturated than the starting material, as indicated by the higher iodine value of the processed asphaltite (see under Example 1). Probably the repolymerization occurs most rapidly at a temperature below the cracking temperature, and I believe the repolymerization, and perhaps the cracking also can be catalyzed by appropriate materials. Thus better results appear to be obtained in copper and aluminum vessels than in iron. This suggests the addition of finely divided metals and sulfur-insensitive cracking catalysts.

While my processed asphaltites are designed chiefly for use in enamels where high initial gloss, and retention of gloss, are important, they may also be used to advantage in any type of bituminous finish where good durability characteristics in general are desired. My processed asphaltites may be used to advantage in combination with any of the oils commonly used in bituminous coating compositions, e. g., linseed oil, China-wood oil, soya bean oil, menhaden (fish) oil, Perilla oil, etc. My processed asphaltites may also be used in combination with any of the varnish resins (natural or synthetic) commonly used in bituminous coating compositions, e. g., oil-soluble phenol-formaldehyde and coumarone resins, rosin, kauri, etc., and with the pigments ordinarily ground into such compositions, e. g., carbon black, lampblack, etc.

The improved luster-retaining characteristics of our coating compositions will be apparent from the following comparison based upon actual tests:

The following table shows the gloss-retentive properties of baking enamels, prepared, according to the formula given in Example 1, from treated wurtzilite, untreated gilsonite and gilsonite treated as in Example 1. The enamels were flowed on steel panels and baked for ½ hour at 450° F., over a bituminous enamel undercoat such as is given in Example 11, similarly baked. These panels, along with suitable controls prepared in the same manner from untreated gilsonite, were exposed to the weather. The exposure tests were in a sense accelerated since the panels were exposed continuously under the most rigid atmospheric conditions, namely, at an angle of 45° facing south. When first prepared these panels had a high gloss, which is a desirable feature in baking enamels, especially in enamels for automobile fenders. It is also desirable that this glossy surface be retained for a long period. The panels were examined at regular intervals and graded for gloss by comparison with five standard panels which were arbitrarily rated as "excellent", "good", "fair", "poor", and "very poor" in gloss. The following table shows the gradings at various times for an enamel prepared from distilled gilsonite (as indicated above) and for the control enamel based on untreated gilsonite. It will be noted that the distilled gilsonite enamel is definitely superior to the control. The following table also shows that volatile material from the cracking of gilsonite can be used as a thinner with results equal to those obtained with ordinary thinners.

*Table III*

| After exposure for time indicated | Enamel based on treated wurtzilite | Enamel based on untreated gilsonite | Enamel based on treated gilsonite thinned with kerosene and Hi-flash naphtha | Enamel based on treated gilsonite thinned with gilsonite distillate |
|---|---|---|---|---|
| 0 weeks | Excellent | Excellent | Excellent | Excellent |
| 4 weeks | Excellent | Excellent | Excellent | Excellent |
| 8 weeks | Fair | Fair | Excellent | Excellent |
| 12 weeks | Fair | Poor | Excellent | Excellent |
| 16 weeks | Very poor | Poor | Good | Good |
| 20 weeks | Very poor | Very poor | Fair | Good |
| 24 weeks | Very poor | Very poor | Fair | Poor |
| 28 weeks | Very poor | Very poor | Fair | Poor |
| 32 weeks | Very poor | Very poor | Poor | Poor |

It will be apparent from the foregoing that the processed bitumen described herein makes possible the formulation of coating compositions, the films of which possess the important advantages of increased durability and long retention of their initial high gloss.

The superior gloss retention and durability of similar enamels based on treated glance pitch (processed as in Example 2) are shown in the following table. The enamels were made up as in Example 1, and panels were prepared and exposed as described above.

*Table IV*

| After exposure for time indicated | Enamel based on original glance pitch | Enamel based on treated glance pitch |
|---|---|---|
| 0 weeks | Excellent | Excellent |
| 4 weeks | Excellent | Excellent |
| 8 weeks | Excellent | Excellent |
| 12 weeks | Fair | Good |
| 16 weeks | Poor | Good |
| 20 weeks | Poor | Good |
| 24 weeks | Poor | Fair |
| 28 weeks | Poor | Fair |
| 32 weeks | Poor | Fair |
| 36 weeks | Poor | Fair |

As many apparently widely different embodiments of this invention may be made without departing from the spirit and scope thereof, it is to be understood that we do not limit ourselves to the specific embodiments thereof except as defined in the following claims.

We claim:

1. Process which comprises heating an asphaltite to a temperature of at least 698° F. and stopping the heating treatment before the temperature rises above 752° F.

2. Process which comprises heating an asphaltite at a temperature of 698–752° F. for 3–10 hours.

3. Process which comprises heating an asphaltite at 698–752° F., maintaining the temperature within this range until the fixed carbon content thereof is substantially raised.

4. Process which comprises heating gilsonite at 698–752° F. until the fixed carbon content thereof has increased 20–65%.

5. Process which comprises heating glance pitch at 698–752° F. until the fixed carbon content thereof has increased 8–40%.

6. Process which comprises distilling an asphaltite at 698–752° F. until 15–25% of its weight is lost.

7. Process of cracking a bituminous body which comprises heating an asphaltite chosen from the group consisting of gilsonite, grahamite, and glance pitch at 698–752° F. until the melting point is substantially lowered, and until the iodine number is substantially raised, and until at least 15% of its weight is lost while maintaining the temperature of the asphaltite between 698° F. and 752° F.

8. Process which comprises heating gilsonite at 698–752° F. until the fixed carbon content thereof has increased 20–65%, collecting the volatile matter driven off and thinning the processed gilsonite therewith, forming thereby a coating composition.

JAMES K HUNT.
JOSEPH HARREL SHIPP.